United States Patent

Kawahara

[15] 3,641,898

[45] Feb. 15, 1972

[54] ELECTRICALLY DRIVEN CAMERA FOR AN ENDOSCOPE

[72] Inventor: Ichizo Kawahara, Tokyo, Japan
[73] Assignee: Olympus Optical Co., Ltd., Tokyo, Japan
[22] Filed: Aug. 19, 1969
[21] Appl. No.: 851,179

[30] Foreign Application Priority Data

Aug. 21, 1968 Japan...............................43/71914
Aug. 21, 1968 Japan...............................43/71915
Aug. 21, 1968 Japan...............................43/71916

[52] U.S. Cl...........................95/31 EL, 95/11 HC, 95/42 R
[51] Int. Cl...................................G03b 19/04, G03b 19/12
[58] Field of Search................95/11, 11 HC, 11 EM, 31 EL, 95/42, 42 X; 128/4-9

[56] References Cited

UNITED STATES PATENTS 2,550,698  5/1951  King et al....................................95/42

FOREIGN PATENTS OR APPLICATIONS 143,572  4/1961  U.S.S.R. .....................................95/11

Primary Examiner—Samuel S. Matthews
Assistant Examiner—Russell E. Adams, Jr.
Attorney—Kurt Kelman

[57] ABSTRACT

Electrically operated single-lens reflex-type camera for an endoscope having an automatic exposure control mechanism which receives the signal in response to the intensity of the light illuminating an object and terminates the illumination of the object automatically for the proper exposure of the film. The feeding of the film is effected by an electric motor provided in the camera by rotating the motor in one direction. When the exposure of the film is effected by manually operable means, the motor is rotated in the reverse direction so as to operate a regulating mechanism which actuates switch means provided in the electric motor-operating circuit while the camera is maintained in the condition for the exposure of the film a predetermined time until the proper exposure of the film is effected by the automatic exposure control mechanism. A movable mirror is interposed between the object and the film to operate as a shutter.

8 Claims, 23 Drawing Figures

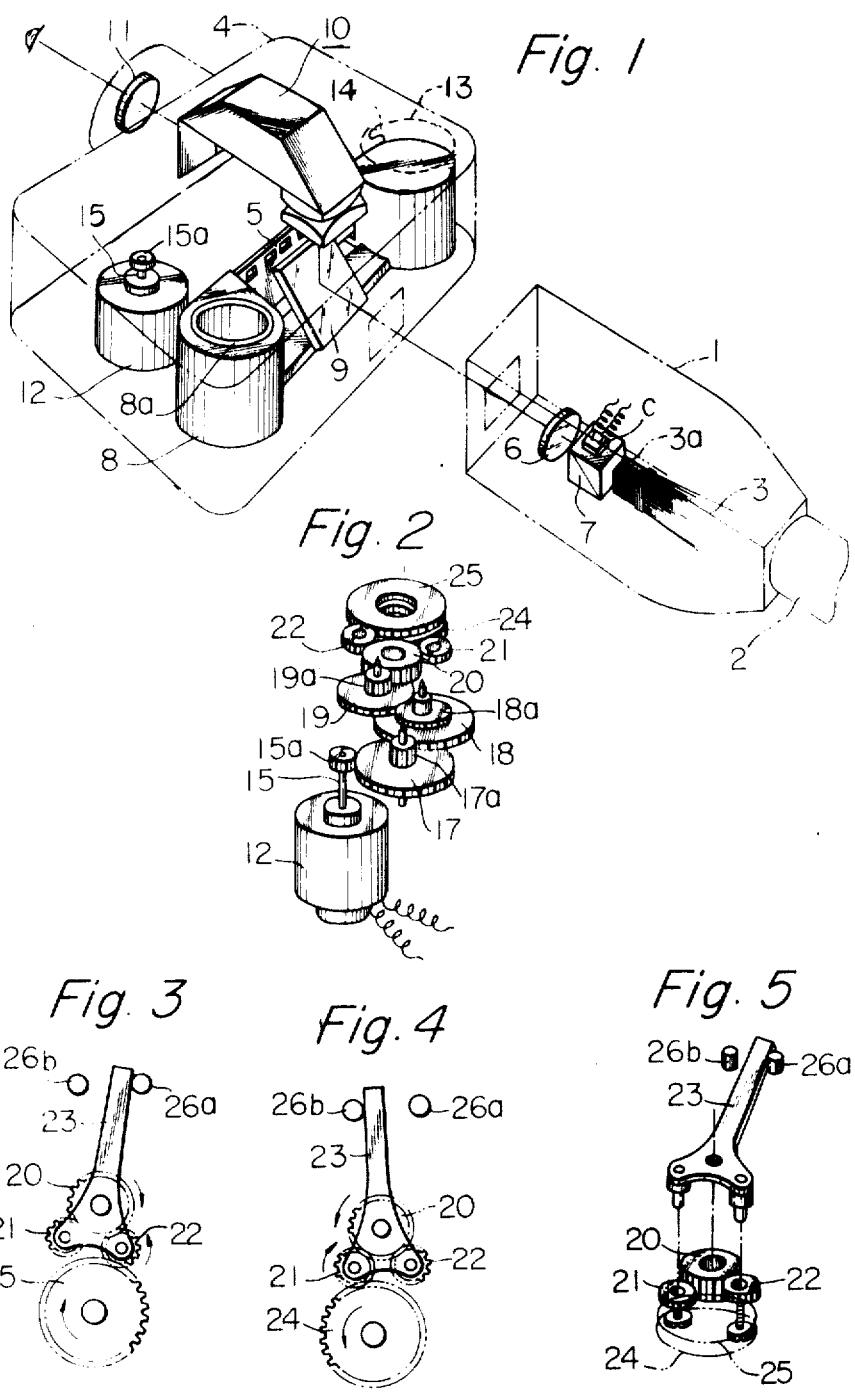

INVENTOR
ICHIZO KAWAHARA
BY
AGENT

ELECTRICALLY DRIVEN CAMERA FOR AN ENDOSCOPE

BACKGROUND OF THE INVENTION

The present invention relates to an electrically driven camera for use with an endoscope, and more particularly, to an electrically driven camera for use with an endoscope having an automatic exposure control mechanism and a light conducting optical system for illuminating an object by the light from an external light source, the light from the light source being intercepted at an appropriate time after the beginning of the exposure of a film loaded in the camera by means of the automatic exposure control mechanism for the proper exposure thereof, the camera having a movable mirror normally held in a first position for directing the light from the object to a finder system for the observation of the object and movable to a second position by manually operable means for directing the light from the object to the film for the exposure thereof. An electric motor rotates in one direction after freeing for feeding the film through a film-feeding mechanism provided in the camera with means incorporated therein for automatically stopping the feeding of the film each time the film is fed by one frame. A regulating mechanism is actuated by the motor when rotating in the opposite direction by the actuation of the manually operable means for returning the movable mirror to its first position after the exposure of the film is completed by the automatic exposure control mechanism, means being provided for rendering the means for stopping the feeding of the film when fed by one frame to be inoperative in order to continuously feed the film until portions of the film at the beginning and the end thereof which are not to be used for the exposure pass across the optical path for the exposure of the film.

Heretofore, a single-lens reflex camera of the conventional type has been used with an endoscope of the type described above for photographing an object while observations of the object is permitted. However, several disadvantages are involved in using such a conventional single-lens reflex camera. For example, only one exposure time of the camera suffices for an endoscope having an automatic exposure control mechanism, which is longer than the proper exposure time determined by the automatic exposure control mechanism. However, a conventional single-lens reflex camera generally has more than ten shutter speeds thereby making the mechanism of the shutter very complicated and the weight and size of the camera very great. Further, quick observation and timely exposure are required in the endoscope because the object to be inspected is in general a moving part of a living body. Therefore, it is disadvantageous to utilize a lever winding system usually incorporated in a conventional single-lens reflex camera for winding up a film-loaded therein. Particularly, it is preferable in an endoscope to wind up the film while the object is being observed. However, this is extremely difficult or impossible in a conventional single-lens reflex camera.

Thus, an automatic feeding of the film by means of an electric power motor is preferred in a camera to be used with an endoscope. In using an endoscope, an electric source is relatively easily available, therefore, it is advantageous to utilize an electric motor for feeding the film in a camera incorporated with the endoscope.

On the other hand, several difficulties arise in utilizing an automatic feeding of the film by means of an electric motor. For example, the film-feeding mechanism must necessarily be complicated. In order to insure the automatic stopping of the feeding of the film each time the film is fed by one frame while the automatic freeing of the stopping of the film feed is effected without fail each time the exposure is effected, means is provided which is mechanically coupled with the manually operable means for effecting the exposure of the film. This will require excessive force and very delicate adjustment of the above means for insuring the above-described two functions. This is disadvantageous and will cause faulty functioning and rapid wear in the mechanism relating to the above functions thereby causing failure of the exposure and shortening the life of the camera. Alternatively, when the freeing of the stopping of the film feed is effected by another actuating member provided separately from the manually operable means in order to insure the above-described two functions, the mechanism would necessarily be complicated, and the force required for feeding the film must necessarily be increased.

In order to maintain the movable mirror of a conventional single-lens reflex camera in the lifted position for the exposure of the film loaded in the camera, governor means is required for holding the mirror in the lifted position until the exposure is completed. A mechanical governor means is usually used for the above purpose, however, such a governor means is mechanically complicated and suffers rapid wear thereby shortening the life thereof. Further, the provision of such a governor means will affect adversely the charging force and the actuation of the manually operable means.

SUMMARY OF THE INVENTION

An object of the present invention is to provide a novel and useful electrically driven camera for use with an endoscope of the type described above in which the above described disadvantages are avoided.

Another object of the present invention is to provide a novel and useful camera of the type described above in which the automatic feeding of the film loaded therein is effected by an electric motor provided in the camera after the exposure of the film is effected and the automatic stopping of the feeding of the film is effected each time the film is fed by one frame while the stopping of the feeding of the film is freed after the feeding of the film by one frame is effected to be ready for the next operation after the successive exposure of the film.

Further object ix to provide a novel and useful camera of the type described above in which the automatic stopping of the feeding of the film is freed for continuously feeding the film until portions of the film at the beginning and the end thereof which are not be be exposed pass across the optical path for the exposure thereby permitting failure of the exposure of the film to be prevented. Still a further object of the present invention is to provide a novel and useful electric circuit for use in the camera of the type described above by which the successive operations of the camera described above is automatically effected sequentially.

These objects of the present invention are achieved by the novel construction of the camera as described below with reference to the drawings illustrating a preferred embodiment of the present invention.

BRIEF DESCRIPTION OF THE DRAWINGS

FIG. 1 is a schematic perspective view illustrating the arrangement of elements of an embodiment of the present invention;

FIG. 2 is a fragmentary perspective view showing the gear train for driving the motor in a selected direction of rotation;

FIG. 3 is a fragmentary plan view showing the manner in which the direction of rotation of the motor switched in the gear train shown in FIG. 2

FIG. 4 is a view similar to FIG. 3 but showing the driving of the motor is switched oppositely to that shown in FIG. 3;

FIG. 5 is a fragmentary perspective view showing the arrangement of the gears shown in FIGS. 3 and 4;

DETAILED DESCRIPTION OF THE PREFERRED EMBODIMENT

Figure 6:
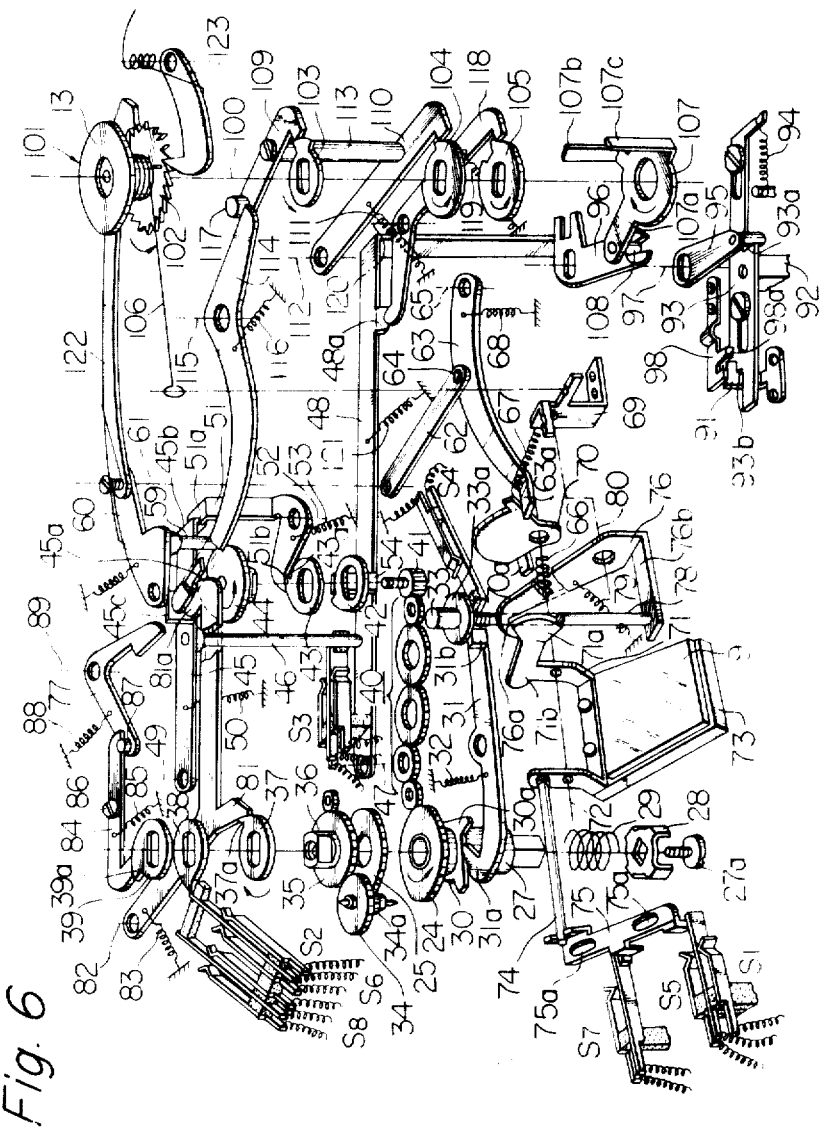
FIG. 6 is a schematic perspective and exploded view showing the overall arrangement of the elements of the present invention.

Referring to FIG. 1, control housing 1 is shown connected to a flexible tube 2 of an endoscope used in the present invention. An image transmitting fiber optical system 3 extends into the flexible tube 2 and the rearward end 3a of the image transmitting optical system 3 terminates in the interior of the control housing 1. An objective lens 6 is located behind and spaced from the rearward end 3a and a beam splitter 7 is interposed between the objective lens 6 and the rearward end 3a. A photoelectric element c is attached to one side surface of the beam splitter 7 so that it receives a portion of the light from an object conducted through the image transmitting optical system 3 to the rearward end 3a by means of the beam splitter 7 while the remaining major part of the light from the object forming an image of the object on the rearward end 3a is transmitted through the objective lens 6 to a camera 4 which is detachably mounted on the control housing 1 by suitable means, such as a bayonet coupling. The camera 4 includes a finder system 10 having an eyepiece 11. A movable mirror 9 located swingably in the path of light from the objective lens 6 normally reflects the light toward the finder system 10 for the observation of the image of the object formed on the rearward end 3a of the image transmitting optical system 3 as usual. A cassette 8 having a film 5 loaded therein is detachably mounted in the camera 4. The cassette has a film takeup chamber and a film supply chamber connected by a bridge in a conventional manner, and the film 5 extends from the interior of the film supply chamber to the film takeup chamber so as to be taken up by a film takeup spool therein having winding claw-engaging portion 8a which is driven by a film-feeding mechanism described later. The portion of the film 5 extending between the two chambers of the cassette 8 is positioned behind the movable mirror 9 at a predetermined distance spaced from the objective lens 6 so that the image formed on the rearward end 3a of the image transmitting optical system 3 is focused on the film 5 when the movable mirror is swung out of the light path from the objective lens 6 to the film 5. An electric motor 12 is provided in the camera 4 for feeding the film 5 by one frame each time the exposure is effected in a manner described later. An exposure counter 13 is located in the camera 4 adjacent to the upper side thereof and a mark indicating the number of the exposure is viewed through a window 14. When the camera 4 is mounted on the control housing 1, electric connection between the camera 4 and the control housing 1 is effected.

The angle of rotation of the film takeup spool is set to be a fixed value, such as 90°, but, since the diameter of the spool is sufficiently large, the increase in the amount of the feeding of the film 5 caused by the rotation of the spool by a fixed angle as the windings of the film on the spool increase is practically acceptable.

As shown in FIG. 2, a motor-pinion 15a is fixed on the end of a shaft 15 of the motor 12 and engages a first gear 17 to which a first pinion 17a is secured coaxially. The first pinion 17a meshes with a second gear 18 to which a second pinion 18a is coaxially secured. The second pinion 18a meshes with a third gear 19 to which a third pinion 19a is secured. The third pinion 19a meshes with a fourth gear 20 so that the gears and pinions form a reduction gear train.

As shown in FIGS. 2 and 5, the thickness of the fourth gear 20 is sufficient to permit a fifth pinion 21 and a sixth pinion 22 to be engaged with the gear 20 in a staggered axial relationship. The gear 20 and the pinions 21, 22 are rotatably mounted on a pivotal lever 23 which is swingable about the axis of the gear 20. Slight rotational friction is imported to each of pinions 21, 22.

As shown in FIG. 2, a seventh gear 24 and eighth gear 25 are arranged in coaxial and superposed relation to each other to be coplanar with pinions 21 and 22, respectively. The seventh gear 24 is secured to a film feed shaft 27 while the eighth gear 25 is operably connected to a regulating mechanism as described below (see FIG. 6). The relative positions of the gears 24, 25 to the gear 20 and the pinions 21, 22 are so determined that, when the gear 20 is rotated in the anticlockwise direction, as shown in FIG. 4, the swingable lever 23 is swung in the same direction, due to the slight rotational friction given to each of the pinions 21, 22, that the pinion 21 is engaged with the gear 24 so to rotate the same in the same anticlockwise direction, whereas when the gear 20 is rotated in the clockwise direction, as shown in FIG. 3, the swingable lever 23 is swung in the clockwise direction so that the pinion 22 meshes with the gear 25 to rotate the same in the clockwise direction.

Thus, the driving force of the motor 12 is alternately transmitted to gear 24 or gear 25, depending upon the direction of rotation of the motor 12, the gear 24 being driven in the anticlockwise direction when the motor 12 is driven in one direction, say in the normal film feeding direction, while the gear 25 is driven in the clockwise direction when the motor 12 is driven in the reverse direction. Pins 26a and 26b fixed to a stationary portion of the camera 4 serve to limit the pivoting angle of swingable lever 23, which would result in forcible locking between the mating gear and pinion.

As shown in FIG. 6, the seventh gear 24 is secured to the upper end of the film-feeding shaft 27 while the eighth gear 25 is freely rotatably supported above the gear 24 coaxially thereto and engaged with gear 35 through pinion 34a and gear 34 integrally fixed to the pinion 34a.

As described previously, gear 24 is engaged with the pinion 21 or gear 25 engages the pinion 22 depending upon the direction of rotation of the motor 12, so that, when the gear 24 is engaged, it is rotated in the anticlockwise direction, as shown in FIG. 6, while when the gear 25 is engaged, it is rotated in the clockwise direction.

The lower end of the film feed shaft 27 is of square cross section and a winding claw 28 having a square hole is slidably fitted on the lower end of the shaft 27 and a screw 27a is screwed in the lower end of the shaft 27 so as to prevent the winding claw 28 from being detached from the shaft 27. A coil spring 29 is located around the lower portion of the shaft 27 above the winding claw 28 so that the same is resiliently urged downwardly while it is rotated together with the shaft 27. As previously described, the winding claw 28 engages with the winding claw-engaging portion 8a of the film takeup spool in the cassette 8 when the same is loaded in the camera 4 so that the film 5 is wound up when the gear 24 is rotated (see FIG. 1).

A release lock cam release lock cam 30 is secured to the shaft 27 beneath the gear 24. The cam 30 is provided with a plurality of pawls 30a in the periphery thereof. The number of the pawls 30a is determined by the angle of rotation of the shaft 27 required to wind up the film by one frame. That is, when the angle of rotation of the shaft 27 is 90° in order to wind up the film by one frame, four pawls 30a are provided around the periphery of the release lock cam 30 equidistantly from each other, and if the angle of rotation of the shaft 27 is 120°, then three pawls 30a are provided.

A release lock lever 31 is pivotably supported in the camera and resiliently urged in the clockwise direction by a spring 32 having one end secured to the lever 31 and its other end secured to a stationary portion in the camera. One end (the left end in FIG. 6) of the lever 31 has a slanted edge portion 31a which is adapted to engage the pawls 30a of the release lock cam 30. Thus, when the shaft 27 rotates in the anticlockwise direction, the pawl 30a will engage the slanted edge portion 31a of the lever 31 so that the same is rotated slightly in the anticlockwise direction against the action of the spring 32. The release lock lever 31 is further provided with a bent portion 31b at the other end (the right-hand end) thereof, and the bent portion 31b is normally located under a flange 33a provided on a manually operable means comprised of a shutter button 33 and a release rod 78 which is normally urged upwardly by a spring provided around the rod 78 so that the downward movement of the release rod 78 is prevented by the bent portion 31b. When the lever 31 is rotated in the anticlockwise direction by the engagement of the slanted edge portion 31a with the pawl 30a of the release lock cam 30 as the same is rotated, the bent portion 31b moves out of the path of movement of the flange 33a so that the manually operable means can be freely pushed down. The angular position of the pawls 30a is so determined that the actuation of the manually operable means is prevented during the feeding of the film while the same can be actuated when the feeding of the film is completed for the next exposure of the film.

As previously described, the rotation of the gear 25 is transmitted to the gear 35 through the pinion 34a and the gear 34 integral therewith, and the angle of rotation of the gear 35 is so multiplied that the gear 35 is rotated by one revolution as the gear 25 rotates an angle corresponding to but in the opposite direction to that of the rotation of the gear 24 which is set to feed the film by one frame. For example, when the angle of rotation of the gear 24 is 90° for the feeding of the film by one frame, the rotational angle of the gear 35 is increased four times the rotational angle of the gear 25, when the gears 24, 25 and the pinions 21, 22 are the same size.

A shaft 36 of a regulating mechanism is secured to the gear 35. The shaft 36 has flatly cut out portions at the peripheral surface thereof. A hook latch cam 37, a switch cam 38 and a mirror release cam 39 each having a hole corresponding in shape to the cross section of the shaft 36 are fitted on the shaft 36 in superposed relation to each other so as to be rotated together with the shaft 36. The operation of the cams 37, 38 and 39 will be described later.

A gear train 40 is engaged with the gear 24 so that the last gear 41 of the gear train 40 is rotated in the anticlockwise direction when the gear 24 rotates in the anticlockwise direction. The gear ratio of the gear train 40 is so set that the last gear 41 is rotated by one complete revolution when the gear 24 rotates an angle by which the film is fed by one frame.

The gear 41 has a shaft on which a pressure plate retracting cam 42, a winding hook cam 43 and a film feed stopping cam 44 are fixedly secured in superposed relation to each other so as to be rotated together with the gear 41.

Figure 7:
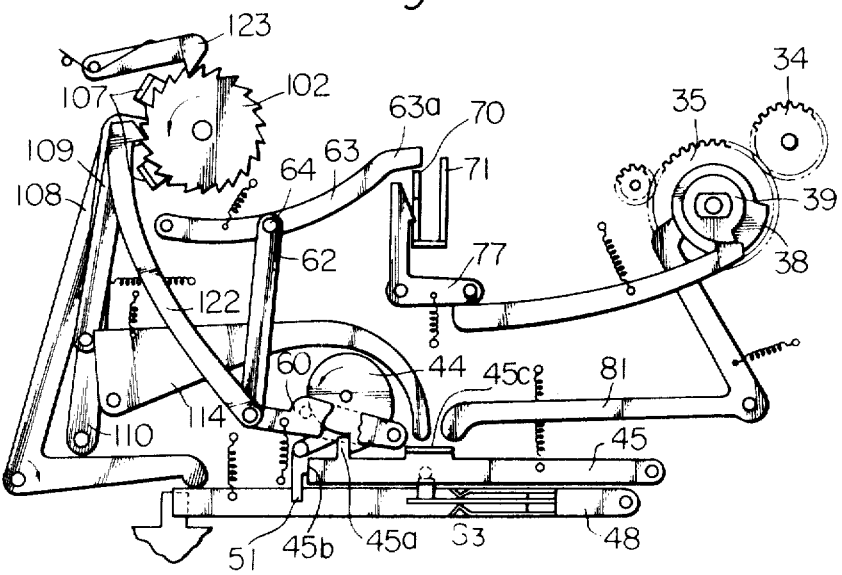
FIG. 7 is a plan view showing the arrangement of the elements shown in FIG. 6.

A film feed stopping lever 45 is provided in the camera 4 so as to rotate about an axis 49 and is resiliently urged in the clockwise direction by a spring 50 having one end secured to the lever while the other end thereof is secured to a stationary portion in the camera. The film feed stopping lever 45 is provided with a projection 45a and a bent portion 45c at one longitudinal side edge thereof while a bent portion 45b is formed at the free end of the lever 45 (FIGS. 6 and 7). The projection 45a is located so as to engage the film feed stopping cam 44 and, when the projection 45a falls into the lower portion of the cam 44, the lever 45 is rotated in the clockwise direction by the action of the spring 50 so that a pin 46 secured to the lever 45 disengages from a movable contact of a switch $S_3$ secured to a switch lever 48. Lever 48 is pivoted at 47 in the camera beneath the lever 45 and resiliently urged in the clockwise direction by a spring 121 having one end secured to the lever 48 and its other end secured to a stationary portion of the camera 4 thereby switching the electrical connection in an electric circuit of the motor 12 described later. On the other hand the pin 46 biases the movable contact of the switch $S_3$ insofar as the projection 45a engages the raised portion of the cam 44.

A film feed stopping hook 51 is pivoted at 52 in the camera and urged in the anticlockwise direction by a spring 53 having one end secured to the hook 51 and its other end secured to a stationary portion of the camera. The hook 51 has an upstanding arm and a bent portion having a stepped portion 51a is formed at the upper end of the upstanding arm of the hook 51. The stepped portion 51a is adapted to engage with the bent portion 45b of the film feed stopping lever 45. The hook 51 has further a horizontally extending arm having a slanted edge portion 51b at its outer end which engages the winding hook cam 43. Thus, when the slanted edge portion 51b engages the raised portion of the winding hook cam 43 as it rotates, the hook 51 is rotated in the clockwise direction against the action of the spring 53 so as to disengage the stepped portion 51a of the hook 51 from the bent portion 45b of the lever 45 thereby permitting the film feed stopping lever 45 to be rotated in the clockwise direction by the action of the spring 50 so that the pin 46 is disengaged from the movable contact of the switch $S_3$. On the other hand, the pin 46 always urges the movable contact of the switch $S_3$ regardless of the rotational position of the film feed stopping cam 44 insofar as the stepped portion 51a of the hook 51 is kept engaged with the bent portion 45b of the lever 45. When the lever 45 is moved in the clockwise direction so as to disengage the pin 46 from the movable contact of the switch $S_3$, the electric circuit of the motor 12 is opened and the motor 12 is rapidly stopped, as described later.

The relative positions of the cams 42, 43 and 44 are so set that, when the hook 51 is disengaged from the bent portion 45b by the action of the cam 43, the projection 45a engages the highest portion of the cam 44 corresponding to the time immediately before the film feeding is stopped. And, when the highest portion of the cam 44 passes across the projection 45a, the lever 45 is rotated in the clockwise direction so as to stop the motor 12. At this time, the raised portion 43a of the cam 43 is slightly in front of the point at which the slanted portion 51b of the hook 51 contacts the cam 43 while the pressure plate retracting cam 42 engages the upstanding arm of a pressure plate retracting lever 54 at the lowest portion of the cam 42, as described below in connection with FIGS. 8 and 9.

Figure 8:
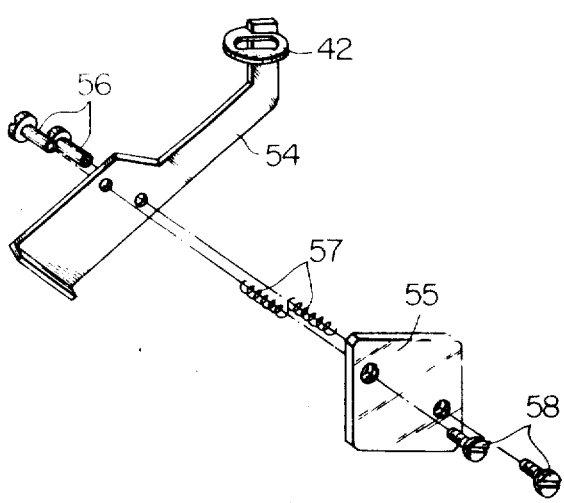
FIG. 8 is a fragmentary perspective view showing the arrangement of the pressure plate with the elements shown exploded.
Figure 9:
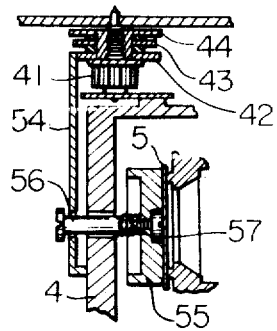
FIG. 9 is a fragmentary sectional view showing the assembling of the pressure plate shown in FIG. 8.

Referring to FIG. 8, the pressure plate retracting lever 54 is loosely supported by a pair of studs 56 loosely passing through the respective holes provided in the pressure plate retracting lever 54. The studs 56 are secured to a pressure plate 55 by means of screws 58, as shown in FIGS. 8 and 9. As shown in FIG. 9, the pressure plate 55 is movably located behind the film 5 on a wall portion of the camera 4 through which the studs 56 slidably extend so as to maintain the film 5 in position in cooperation with film guide rails located oppositely thereto when the exposure thereof is effected while the pressure plate 55 is retracted to free the film 5 when the same is to be fed as described below. To this end, a coil spring 57 surrounds each of the studs 56 between the wall portion of the camera and the pressure plate 55, so as to urge the pressure plate 55 against the film guide rails. As shown in FIG. 9, the pressure plate retracting lever 54 is provided with a bent portion at the end opposite to that at which the upstanding arm is formed so that the lever 54 is supported by the bent portion abutting against the wall portion of the camera and the studs 56. When the pressure plate retracting cam 42 rotates and the raised portion thereof is engaged with the upstanding arm of the lever 54, the same is moved in the direction away from the wall portion, so that the studs 56 are retracted to move the pressure plate 55 away from the film guide rails against the action of the springs 57 thereby freeing the film 5 for the feeding thereof. The rotational position of the cam 42 is so set that the pressure plate 55 is retracted by the action of the cam 42 during the feeding of the film while the pressure plate 55 is urged against the film guide rails during the exposure of the film by the engagement of the lowest portion of the cam 42 with the upstanding arm of the lever 54.

Referring again to FIG. 6, the film feed stopping cam 44 also serves as a cam for charging a movable mirror actuating mechanism, as described below. To this end, a charging lever 60 provided with a charging pin 59 extending downwardly therefrom is pivotally located above the cam 44 and the lever 60 is normally urged in the clockwise direction by a spring having one end secured to the lever 60 and its other end secured to a stationary portion of the camera. The pin 59 is adapted to engage the cam 44 so that the lever 60 is swung in the anticlockwise direction when the raised portion of the cam 44 engages the pin 59 as it rotates. A connecting rod 62 is pivotally connected with its one end to the free end of the charging lever 60 by means of a screw, and the other end of the connecting rod 62 is pivotally connected by a stud 64 to an intermediate portion of a second charging lever 63 which is pivotally secured at 65 to the camera 4 and normally urged in the anticlockwise direction by a spring 68 one end of which is secured to the lever 63 while the other end thereof is secured to a stationary portion of the camera so that, each time the lever 60 is swung in the anticlockwise direction by means of the cam 44 the lever 63 is swung in the clockwise direction against the action of the spring 68.

The free end 63a of the second charging lever 63 is adapted to engage the side edge of a mirror lever 70 journaled on a shaft 72 secured to the camera so as to rotate about the same. The mirror lever 70 is normally urged in the clockwise direction, as shown in FIGS. 6, 10, 11 and 12 by a return spring 67 one end of which is secured to the mirror lever 70 while the other end thereof is secured to a stationary member 69 provided in the camera so that the lever 70 is urged against the free end 63a of the second charging lever 63. A mirror bracket 71 having two arms is rotatably journaled on the shaft 72 and supports a mirror frame 73 to which the movable mirror 9 is secured. A charging spring 66 is provided around the shaft 72 between the mirror lever 70 and the adjacent arm of the mirror bracket 71. One end of the spring 66 is secured to the mirror lever 70 while the other end thereof is secured to the adjacent arm of the bracket 71 so that, when the mirror lever 70 is rotated in the anticlockwise direction relative to the mirror bracket 71, the spring 66 is energized to drive the mirror bracket 71 in the same direction.

A release lever 76 is pivoted at 80 and a horizontally extending arm 76b of the lever 76 is located beneath the lower end of the release rod 78 so as to be actuated thereby when the rid 78 is pushed downwardly while an obliquely upwardly extending arm of the lever 76 is provided at its outer end with a hook portion 76a which is adapted to engage a projection 71a formed at the outer end of the adjacent arm of the mirror bracket 71 so that the mirror 9 is arrested in its lower position at which the light from the object is reflected to the finder system for the observation of the object. The release lever 76 is normally urged in the anticlockwise direction by a spring 70 having one end secured to the lever 76 and its other end secured to the stationary portion in the camera so that the engagement of the hook portion 76a of the lever 76 with the projection 71a of the bracket 71 is insured. When the release rod 78 is depressed, the release lever 76 is rotated in the clockwise direction thereby disengaging the hook portion 76a from the projection 71a.

A bent portion 70a is formed at the other side edge of the mirror lever 70 which is adapted to abut against a projection 71b formed at the outer end of the adjacent arm of the mirror bracket 71 when the mirror 9 is swung upwardly.

A pin 74 extends horizontally from the outer end of the remote arm of the bracket 71 and it engages with a bifurcation formed in a bent portion provided at one side edge of a slidably plate 75 slidably guided by stationary pin means slidably engaging elongated holes 75a provided in the slidably plate 75. A pair of bent portions are provided at the opposite side edge of the plate 75. Each of the bent portions is adapted to urge the respective movable contacts of switches $S_1$, $S_3$ and $S_7$ so that, when the mirror 9 is swung upwardly, the slidable plate 75 is shifted by the engagement of the pin 74 with the bifurcation of the plate 75 so that switch $S_5$ is closed to rotate the motor 12 in the reverse direction while the switch $S_7$ is closed so as to energize the automatic exposure control mechanism, as described later.

Figure 10:
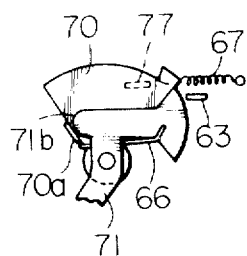
FIGS. 10, 11 and 12 are fragmentary views showing the relative positions of the mirror lever and the mirror plate in the various phases of operation.
Figure 11:
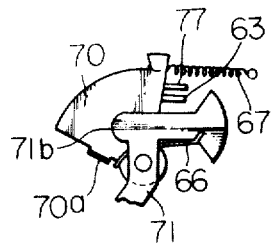
Figure 12:
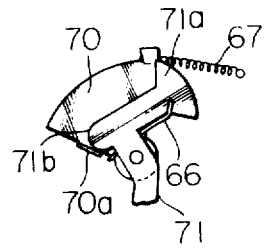

FIGS. 10 to 12 show how the mirror bracket 71 is operated. The charging spring 66 is initially loaded so as to urge the mirror bracket 71 in the anticlockwise direction with respect to the mirror lever 70 so that the projection 71b of the bracket 71 abuts against the bent portion 70a of the lever 70. When the lever 70 is driven in the anticlockwise direction by the action of the charging lever 63 against the action of the spring 67 while the bracket 71 is held stationary by the engagement of the projection 71a with the hook portion 76a of the release lever 76, the spring 66 is further energized so that, when the hook portion 76a of the release lever 76 is disengaged from the projection 71a of the mirror bracket 71 by the action of the release lever 76, the mirror 9 is quickly rotated in the anticlockwise direction by the action of the energized coil spring 66 until the projection 71b abuts against the bent portion 70a of the lever 70. In this position the exposure of the film is made possible. When the lever 70 is returned to its initial position by the action of the spring 67, the bracket 71 is also returned to its initial position by the engagement of the projection 71b with the bent portion 70a.

In order to maintain the mirror 9 in its upwardly rotated position sufficiently for permitting the exposure of the film to be effected, as determined by the automatic exposure control mechanism incorporated in the camera which senses the intensity of light from the object by the photoelectric element $c$ and intercepts the illuminating light from the light source so as to terminate the exposure after the proper exposure of the film is effected, a mirror hook lever 77 is provided so as to pivot about an axis 89 (see FIG. 6). The mirror hook lever 77 is normally urged in the clockwise direction by a spring 88 having one end secured to the lever 77 and its other end secured to a stationary portion of the camera so as to insure the positive engagement of the lever 77 with the mirror lever 70. A latch portion is provided at the outer end of one arm of the hook lever 77 which is adapted to engage the one side edge of the lever 70 so as to arrest the lever 70 in its arrested position by the hook lever 77. A pin 87 is secured to the outer end of another arm of the lever 77 which engages one end of a mirror release lever 84 pivotally secured to the camera by a screw 86 at an intermediate portion of the lever 84. The other end of the lever 84 engages the mirror release cam 39 of the regulating mechanism previously described. The lever 84 is normally urged in the anticlockwise direction by a spring 85 one end of which is secured to the lever 84 while the other end thereof is secured to a stationary portion of the camera so as to insure the positive engagement of the lever 84 with the cam 39.

The switch cam 38 of the regulating mechanism is adapted to engage the movable contacts of switches $S_2$, $S_6$ and $S_8$ connected by an insulating member so as to move integrally.

The hook latch cam 37 is engaged with a projection formed at an intermediate portion of a hook latch lever 81 pivoted at 82 and urged in the clockwise direction by a spring 83 one end of which is secured to the lever 81 while the other end thereof is secured to a stationary portion of the camera. The outer end of the lever 81 is provided with a laterally extending portion 81a which is adapted to abut against the bent portion 45c of the film feed stopping lever 45.

Thus, when the motor 12 is driven in the reverse direction by the upward movement of the mirror 9 as the release rod 78 is depressed for the exposure of the film, the gear 25 is rotated in the clockwise direction, as previously described, so that the gear 35 is also driven in the clockwise direction to rotate the cams 37, 38, 39.

As the cam 38 is rotated a certain angle within one complete revolution, the raised portion of the cam 38 biased the movable contacts of the switches $S_2$, $S_6$ and $S_8$ so that the switch $S_2$ is opened and the switch $S_6$ is closed while the switch $S_8$ is switched. However, the reverse rotation of the motor 12 is continued as described later. Further rotation of the motor 12 in the reverse direction causes the raised portion 37a of the hook latch cam 37 to engage the projection of the hook latch lever 81 so that the same is rotated in the anticlockwise direction against the action of the spring 83 thereby urging the film feed stopping lever 45 in the anticlockwise direction by the engagement of the laterally extending portion 81a with the bent portion 45c of the lever 45. As the lever 45 rotates in the anticlockwise direction, the bent portion 45b at the outer end of the lever 45 is latched by the stepped portion 51a of the film feed stopping hook 51 thereby maintaining the pin 46 in the position in which it biases the movable contact of the switch $S_3$ so as to close the same. In this condition, the motor 12 is still driven in the reverse direction. The speed of the rotation of the shaft 36 is so determined by a variable resistor $Vr$ provided in the electric circuit of the motor 12 to be described later that the proper exposure of the film is completed by the automatic exposure control mechanism also described later. At the last portion of one revolution of the cam 39, further rotation of the shaft 36 causes the raised portion 39a of the mirror release cam 39 to engage the mirror release lever 84 so as to rotate the same in the clockwise direction against the action of the spring 85 thereby urging the hook lever 77 in the anticlockwise direction so that the mirror cam 70, which has been arrested by the lever 77 is released to move back in the clockwise direction by the action of the spring 67, together with the mirror bracket 71, by the engagement of the projection 71b of the mirror bracket 71 with the bent portion 70a of the lever 70 so that the camera is brought to the object observing position. At this time, the coil spring 66 simply connects the lever 70 and the bracket 71 and causes no movement of the lever 70 and the bracket 71.

When the release rod 78 is moved upwardly by freeing the shutter button 33, the release lever 76 is moved in the anticlockwise direction by the action of the spring 79 so that the hook portion 76a of the lever 76 engages the projection 71a of the mirror bracket 71a to arrest the mirror 9 in the object observing position. The switches $S_1$, $S_5$ and $S_7$ are again switched by the movement of the slidable plate 75 caused by the pin 74.

A movable contact of a switch is located beneath the flange 33a of the shutter button 33 so that, when the release rod 78 is in its upper position, the switch $S_4$ is closed. The operation of the switch $S_4$ will be described later.

Figure 13:
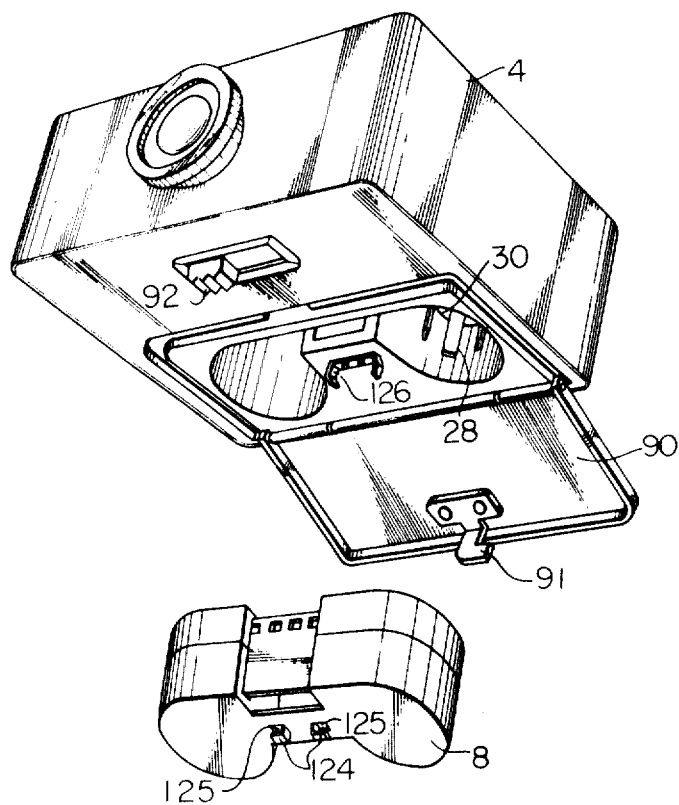
FIG. 13 is a perspective view showing the manner of loading the film cassette in the camera of the present invention.

Referring to FIG. 13, the camera 4 has a side cover 90 hinged thereto. The rear cover 90 is provided with a latch member 91 secured to the inside thereof adjacent to the free end edge thereof. The latch member 91 is adapted to be locked by a stepped portion 93b of a locking plate 93 (FIG. 6) shiftably secured to the inside surface of the camera so as to prevent the rear cover 90 from being opened. The locking plate 93 is urged to the left in FIG. 6 by a spring 94 having one end secured to the locking plate 93 and with its other end secured to a stationary member fixed to the camera and is provided with a knob 92 extending to the outside of the camera 4 through an elongated hole formed in the camera wall so that the locking plate 93 is shifted to the right by manually operating the knob 92 against the action of the spring 94 so as to disengage the stepped portion 93b from the latch member 91 thereby permitting the rear cover 90 to be opened. A locking plate latch spring 98 is secured at its one end at a position adjacent to the locking plate 93 so that the free end of the spring 98 is resiliently urged against the outer end of the latch member 91 when the rear cover 90 is closed. The locking plate latch spring 98 has a bent portion 98a adapted to engage with the stepped portion 93b when the locking plate 91 is moved to the right. Therefore, when the locking plate is moved to the right by the operation of the knob 92 when the rear cover 90 is closed, the latch member 91 is disengaged from the stepped portion 93b and, at the same time, the free end of the locking plate latch spring 98 biases the latch member 91 so that the rear cover 90 is positively opened while the locking plate 93 is latched in its rightward shifted position by the engagement of the bent portion 98a with the stepped portion 93b thereby facilitating the next closure of the rear cover 90. When the rear cover 90 is again closed, the latch member 91 biases the free end of the spring 98 so that the bent portion 98a is disengaged from the stepped portion 93b of the locking plate 93 thereby permitting the same to be shifted toward the left by the action of the spring 94 to lock the rear cover 90 in its closed position.

The locking plate 93 is further provided with a stepped portion 93a which is adapted to engage a pin secured to the outer end of a lower lever 95 which is pivotable about an axis 97 together with an upper lever 96 integrally secured to the lever 95. Thus, when the locking plate 93 is shifted to the right, the levers 95, 96 are swung to the right, the levers i.e., in the anticlockwise direction. An arm of the lever 96 is adapted to engage a depending arm extending downwardly from the outer end of the switch lever 48 supporting thereon the switch $S_3$ as previously described. Therefore, the anticlockwise swinging of the lever 96 causes the lever 48 to rotate in the anticlockwise direction thereby moving the movable contact of the switch $S_3$ away from the pin 46 of the film feed stopping lever 45 so that the pin 46 is made inoperative to move the movable contact of the switch $S_3$ even though the lever 45 is rotated in the anticlockwise direction. Thus, the switch $S_3$ is kept in opened state. This insures that the switch $S_3$ is always kept in opened state when the rear cover 90 is opened.

A vertical shaft 100 (FIG. 6) is rotatably secured to the camera 4, and the exposure counter 13 cooperating with a stationary index mark 101 provided on the camera and a ratchet wheel 102 integral with the exposure counter 13 are fixedly secured to the shaft 100. Further, a first cam 103, a second cam 104 and a third cam 105 are fixedly secured to the shaft 100 beneath the ratchet wheel 102. The assembly comprised of the exposure counter 13, the ratchet wheel 102, the cams 103, 104 and 105 is urged in the clockwise direction by a spring 106 surrounding the hub of the ratchet wheel 102 and secured at its one end to the ratchet wheel 102 and at its other end to a stationary portion of the camera. The clockwise rotation of the assembly is stopped by a suitable stopper means so that a starting mark S on the exposure counter 13 coincides with the stationary index mark 101 at the initial position of the assembly.

A release ring 107 is rotatably fitted on the shaft 100 beneath the third cam 105. The release ring 107 is provided with two upstanding arms 107b and 107c extending upwardly from the periphery of the ring 107 in spaced relation from each other. A horizontally extending arm 107a is provided on the ring 107 and a pin 108 secured to the outer end of the arm 107a is engaged with a bifurcated portion formed in the outer end of another lever of the upper arm 96.

A first lever 109 is rotatably secured to the upper end of a pin 113 which is fixedly secured to a second lever 110 at an intermediate portion thereof. The second lever 110 is pivoted at 112 and urged in the clockwise direction by a spring 111 one end of which is secured to the lever 110 while the other end thereof is secured to a stationary portion of the camera. The outer end of the second lever 110 is adapted to engage the second cam 104 while one end of the first lever 109 is adapted to engage the first cam 103. The other end of the lever 109 is provided with a pin 117 which engages one end of an idle lever 114 pivoted at 115 and urged in the anticlockwise direction by a spring 116 one end of which is secured to the lever 114 while the other end thereof is secured to a stationary portion of the camera. The other end of the idle lever 114 is adapted to abut against the bent portion 45c of the film feed stopping lever 45.

One end of a third lever 118 pivoted at 120 engages the third cam 105 while the other end thereof abuts against a bent portion 48a provided on the switch lever 48. To insure the engagement of the lever 118 with the cam 105 and the bent portion 48a, one end of a spring 119 is secured to the lever 118 and the other end is secured to a stationary portion of the camera.

Figure 15:
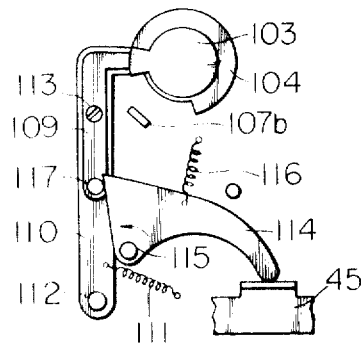
FIGS. 15, 16 and 17 are schematic views showing the relative operational positions of the elements actuating the exposure counter in various phases of operation.
Figure 16:
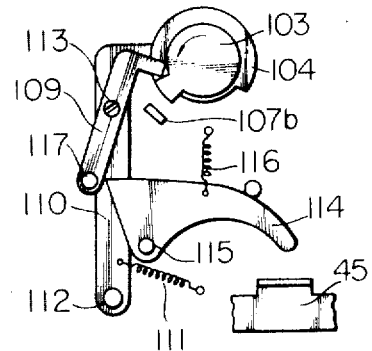
Figure 17:
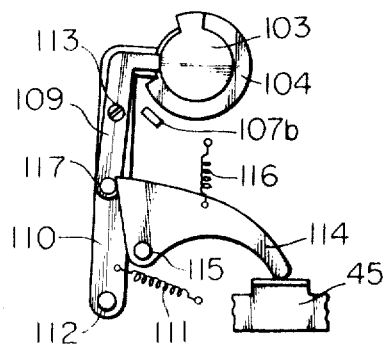

Under the conditions shown in FIG. 6, the outer end of the first lever 109 abuts against the highest portion of the first cam 103, thereby urging the idle lever 114 in the clockwise direction by means of the pin 117 so as to rotate the film feed stopping lever 45 in the anticlockwise direction to urge the lever 45 in the anticlockwise direction so that the switch S₃ is actuated by the pin 46 by selecting the lever ratio appropriately even though the lever 109 engages the lower portion of the cam 103 unless the rear cover 90 is opened. (Refer to FIGS. 15-17). FIG. 15 shows the relative positions of the elements described above when the exposure counter 13 is in its starting position or it is in the position for the exposure of the first frame of the film. FIG. 16 shows the relative positions of the elements when the film has been fed to a position for the exposure of the last frame of the film, while FIG. 17 shows the condition after the film is fed beyond the last frame of the film.

When the third cam 105 rotates and the third lever 118 engages the lower portion of the cam 105, the lever 118 is rotated in the clockwise direction by the action of the spring 119 so that the end of the lever 118 abutting against the bent portion 48a of the lever 48 urges the lever 48 in the anticlockwise direction thereby rendering the pin 46 inoperative to actuate the switch S₃ even though the lever 45 is rotated in the anticlockwise direction as in the case of opening the rear cover 90.

In order to operate the exposure counter 13 each time the film is fed by one frame for the next exposure, a ratchet-feeding pawl member 122 is provided. One end of the feeding pawl member 122 is pivotally connected to the outer end of the charging lever 60 to which the connecting rod 62 is also pivotally connected. The other end of the pawl member 122 is provided with a pawl which engages the ratchet 102. In order to insure the positive engagement of the pawl with the ratchet, a spring is provided which surrounds the screw pivotally connecting the charging lever 60 to the pawl member 122 and one leg of the spring is secured to the pawl member 122 while the other leg is secured to the charging lever 60 so as to urge the pawl member 122 in the clockwise direction with respect to the charging lever 60. Thus, each time the film feed stopping cam 44 rotates one revolution corresponding to the feeding of the film by one frame, the charging lever 60 is swung in the anticlockwise direction so that the pawl member 122 is moved toward the left (FIG. 6) thereby rotating the exposure counter 13 in the anticlockwise direction by the engagement of the pawl with the ratchet wheel 102 so as to indicate the exposure number corresponding to the frame of the film brought to the position for the exposure while the charging lever 60 also actuates the second charging lever 63 for rotating the mirror lever 70 in the anticlockwise direction, as described previously. A stopping pawl member 123 is provided so as to prevent the ratchet 102 from being returned from the position fed by the pawl member 122. The pawl member 123 is pivotally secured to the camera and urged in the clockwise direction by a spring so as to positively engage the pawl member 123 with the ratchet 102.

The upstanding arm 107b of the release ring 107 cooperates with the pawl member 122, the first lever 109, the second lever 110 and the third lever 118. When the locking plate 93 is moved toward the right in FIG. 6 so as to open the rear cover 90 and the lever 96 is rotated in the anticlockwise direction, the release ring 107 is rotated in the clockwise direction by the engagement of the pin 108 with the lever 96 and the upstanding arm 107b urges the pawl member 122 and the levers 109, 110 and 118 out of engagement with the respective mating ratchet 102 and the cams 103, 104 and 105. And the upstanding arm 107c of the release ring 107 cooperates with the pawl member 123. When the ring 107 is rotated in the clockwise direction, the upstanding arm 107c urges the pawl member 123 out of engagement with the ratchet 102. Therefore, the ratchet 102 is rotated together with the exposure counter 13 and the cams 103, 104 and 105 in the clockwise direction by the action of the spring 106 to its initial position at which the S mark of the exposure counter 13 registers with the stationary index 101 while the cams 103, 104 and 105 are returned to their initial positions, respectively. The size and the angular position of the raised portion of the cam 103 are so set that, at the beginning of the feeding of the film after the cassette 8 is loaded in the camera, the film feed stopping lever 45 is kept in the position rotated in the anticlockwise direction by the idle lever 114 at which the switch S₃ is kept closed by means of the pin 46 thereby permitting the motor 12 to continue to rotate in the film-feeding direction until the first portion of the film which has been already exposed uselessly during the loading of the cassette in the camera passes across the position for the exposure of the film so that the proper exposure of the first frame of the film is insured. After the useless portion of the film at the beginning thereof is fed, the exposure counter 13 indicates the No. 1 mark. When the No. 1 mark is indicated by the exposure counter 13, the lever 109 falls in the lower portion of the cam 103 so that the idle lever 114 is rotated anticlockwise thereby returning the film feed stopping 45 in the clockwise direction so as to enable the pin 46 to actuate the switch S₃ each time the cam 44 is rotated one revolution for the automatic film feed stopping operation.

In order to prevent the last part of the effectively exposed frames of the film from being adversely exposed to the daylight when the cassette 8 is removed from the camera after the exposure of the film has been completed, it is necessary to feed the last part of the film sufficiently into the takeup chamber of the cassette 8 beyond the last frame effectively exposed. To this end, the cam 104 is provided with a lower portion and the second lever 110 falls into the lower portion of the cam 104 before the automatic stopping of the film is effected after the last frame of the film effectively exposed has passed across the position for the exposure of the film. Therefore, the lever 110 is rotated in the clockwise direction by the engagement of the lever 110 with the lower portion of the cam 104 so as to move the pin 113, i.e., the fulcrum of the lever 109, in the clockwise direction thereby permitting the lever 109 to urge the idle lever 114 in the clockwise direction even though the lever 109 engages with the lower portion of the cam 103. This causes the film feed stopping lever 45 to be kept in the position rotated in the anticlockwise direction so that the pin 46 continues to actuate the switch S₃ regardless of the angular position of the cam 44 thereby permitting the film to be fed continuously.

In order to automatically stop the motor 12 after the last part of the film has been sufficiently fed into the takeup chamber of the cassette as described above, the cam 105 is provided with a lower portion and the angular position of the lower portion of the cam 105 is so set that the lever 118 engages the lower portion when the last portion of the film has been sufficiently fed into the takeup chamber of the cassette 8 so that the lever 118 is rotated in the clockwise direction to urge the switch lever 48 in the anticlockwise direction thereby rendering the pin 46 of the film feed stopping lever 45 to be inoperative to actuate the switch S₃ thus stopping the motor 12. After the exposure of all the frames of the film has been completed and when the locking plate 93 is shifted to the right for opening the rear cover 90 to remove the cassette from the camera, the release ring 107 is rotated in the clockwise direction by the lever 96 so that the ratchet 102 and cams 103, 104 and 105 are disengaged from the respective pawl members 122, 123, and the levers 109, 110 and 118 by means of the upstanding arms 107b and 107c so that the assembly comprising the exposure counter 13, ratchet 102 and the cams 103, 104 and 105 is returned to its initial position by means of the spring 106 as previously described.

Figure 14:
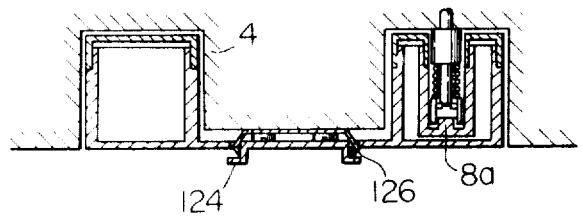
FIG. 14 is a fragmentary sectional view showing how the cassette is fixed in the camera shown in FIG. 13.

Referring to FIGS. 13 and 14, L-shaped latch means 124 are provided on the bridge of the cassette 8 and a through-hole 125 is formed adjacent to each of the latch means 124 as shown in FIG. 13. A spring 126 having two legs is secured to the camera at a position at which the two legs of the spring 126 snugly engage the latch means 124 through the holes 125 when the cassette 8 is loaded in the camera so that the cassette 8 is held in position in the camera. When the cassette 8 is loaded on the camera, the winding claw 28 of the film-feeding mechanism engages the mating portion 8a of the takeup spool so that the takeup spool is rotated by the winding claw 28 to feed the film into the takeup chamber of the cassette when the film-feeding mechanism is actuated. The spring 29 allows the claw 28 to be retracted when the mating portion 8a is not in the position at which it snugly engages the claw 28 so as to prevent the breakage of the mating members. When the claw 28 is rotated, the claw 28 comes to the position snugly engageable with the mating portion 8a so that the claw 28 is urged by the spring 29 to snugly engage the mating portion 8a. The force of the spring 126 is greater than the force of the spring 29 so as to prevent the cassette 8 from being detached from the camera even though the claw 28 does not snugly engage the mating portion 8a.

FIGS. 18 to 23 show the various positions of the switches in the electric circuit used in the present invention to drive the motor 12 (designated by M in these figures) in the reverse direction so as to actuate the regulating mechanism when the exposure is effected while the motor M is driven in the film-feeding direction so as to automatically feed the film by one frame each time the exposure is terminated.

The movable contact of the switches $S_2$, $S_6$ is connected to one terminal of the motor M, the stationary contact of switch $S_2$ is connected to the movable contact of the switches $S_1$, $S_5$, and the stationary contact of switch $S_6$ is connected to the stationary contact ($S_5$) of switch $S_5$. The stationary contact of switch $S_5$ is connected to one terminal (minus terminal in the drawings) of an electric power source B through a variable resistor $V$. The stationary contact of switch $S_1$ is connected to the other terminal (plus terminal) of the electric power source B through switch $S_4$.

The other terminal of the motor M is connected to the movable contact of the switch $S_8$ and one stationary contact of the switch $S_8$ is connected to the movable contact of the switch $S_3$ while the other stationary contact of the switch $S_8$ is connected to the other terminal (plus terminal) of the electric power source B. One stationary contact of the switch $S_3$ is connected to the one terminal (minus terminal) of the electric power source B while the other stationary contact of the switch $S_3$ is connected to the other terminal (plus terminal) of the electric power source B.

The switches are so arranged that the switch $S_2$ is closed and the switch $S_6$ is opened while the movable contact of the switch $S_8$ is connected to the movable contact of the switch $S_3$ when the raised portion of the cam 38 contacts the movable contacts of the switches $S_2$, $S_6$ and $S_8$. And the switch $S_1$ is closed and the switch $S_5$ is opened when the mirror 9 is in its lower object observing position. The switch $S_7$ (FIG. 6) is opened in the lower position of the mirror 9. The switch $S_4$ is opened when the release rod 78 is depressed. The movable contact of the switch $S_3$ is connected to the one terminal (minus terminal) of the electric power source B when the film feed stopping lever 45 is rotated in the anticlockwise direction so that the pin 46 biases the movable contact of the switch $S_3$ unless the lever 48 supporting the switch $S_3$ thereon is rotated in the anticlockwise direction so as to render the pin inoperative to bias the movable contact of the switch $S_3$.

Figure 18:
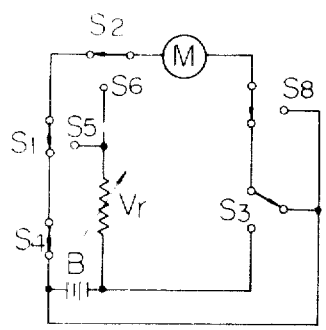
FIGS. 18 to 23 are diagrams showing the electric circuit incorporated in the camera of the present invention in various phases of operation.

FIG. 18 shows the circuit conditions in which the charging of the spring 66 and the feeding of the film have been completed and the film is stopped, the motor M being deenergized by the positions of the various switches, as shown.

Figure 19:
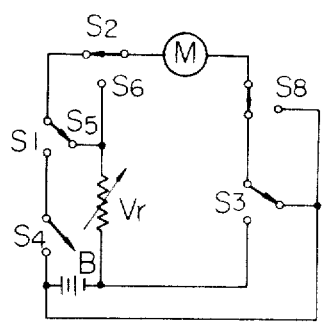

FIG. 19 shows the conditions in which the release rod 78 is depressed so as to rotate the release lever 76 so that the mirror 9 is moved upwardly for the exposure of the film. The switch $S_4$ and the switch $S_1$ is opened while the switch $S_5$ is closed. Thus, the motor M is supplied with a voltage of the opposite polarity to that of the normal film feeding condition, thereby rotating the motor M in the reverse direction. The switch $S_7$ is closed so as to commence the operation of the automatic exposure control mechanism described later.

Figure 20:
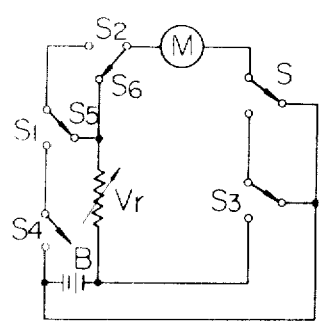

FIG. 20 shows the conditions in which the raised portion of the cam 38 contacts the movable contacts of the switches $S_2$, $S_6$ and $S_8$ by the rotation of the cam 38 caused by the reverse rotation of the motor M so that the switch $S_2$ is opened and the switch $S_6$ is closed while the movable contact of the switch $S_8$ is connected to the other terminal (plus terminal) of the electric power source B. However, the motor M is still supplied with the voltage of the opposite polarity and continues to rotate in the reverse direction.

Figure 21:
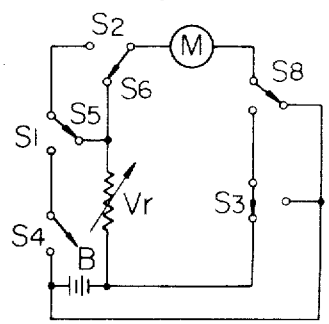

FIG. 21 shows the conditions in which the raised portion 37a of the cam 37 engages the projection of the lever 81 so that the lever 45 is rotated in the anticlockwise direction thereby latching the same by the hook 51. Thus, the movable contact of the switch $S_3$ is connected to the one terminal (minus terminal) of the electric power source B. However, the motor M is still driven in the reverse direction, because the movable contact of the switch $S_8$ is still connected to the other terminal (plus terminal) of the electric power source B.

Figure 22:
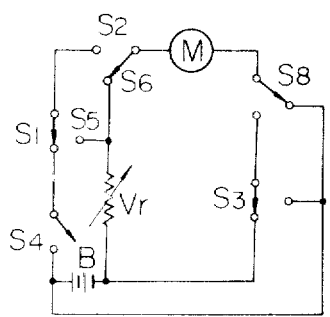
Figure 23:
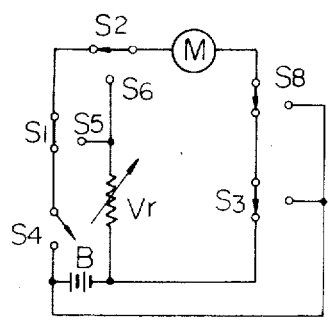

FIG. 22 shows the conditions in which the raised portion 39a of the cam 39 engages the lever 84 by the further rotation of the motor M in the reverse direction so that the mirror 9 is lowered to the object observing position by the disengagement of the lever 77 from the mirror 9. Thus, the switch $S_1$ is closed while the switch $S_5$ is opened. Also, the switch $S_7$ is opened to render the automatic exposure control mechanism inoperative. By appropriately adjusting the speed of the motor by means of the variable resistor vr, the movement of the mirror and the opening of the switch $S_7$ are effected after the proper exposure of the film is effected by the automatic exposure control mechanism to be described later. The motor M still continues to rotate in the reverse direction and, when the gear 35 rotates one complete revolution, the lower portion of the cam 38 comes to contact the movable contacts of the switches $S_2$, $S_6$ and $S_8$ thereby closing the switch $S_2$ while the switch $S_6$ is opened and the movable contact of the switch $S_8$ is connected to the movable contact of the switch $S_3$, as shown in the FIG. 23. Thus, the electric circuit is made ready for the film-feeding operation.

When the release rod 78 is freed to close the switch $S_4$, then the motor M is driven in the film-feeding direction so as to feed the film.

As described previously, the lever 31 prevents the shutter button 33 from being operated during the feeding of the film.

By the provision of the variable resistor Vr, the speed of the motor M can be lowered as desired thereby permitting a complicated mechanical governor means to be omitted.

In the camera of the present invention, no complicated shutter mechanism is required, the mirror 9 serving to intercept the light directed to the film during the feeding of the film.

The endoscope to be used with the camera of the present invention includes an illumination light conducting optical system which transmits the light from an external light source therethrough to the forward end of the endoscope so as to illuminate the object. The light reflected from the object is received by the image transmitting optical system 3 through an objective lens so as to form an image of the object on the forward end of the image-transmitting optical system. The image is transmitted through the image-transmitting optical system 3 to the rearward end 3a so as to be viewed or photographed through the objective lens 6. The photoelectric element c attached to the beam splitter 7 interposed between the objective lens 6 and the rearward end 3a of the image-transmitting optical system 3 receives a portion of the light from the object the intensity of which is the function of the intensity of the light to be received by the film. The signal generated by the photoelectric element in response to the intensity of the light received by the photoelectric element c is supplied to the automatic exposure control mechanism so that the proper exposure time is determined by the automatic exposure control mechanism to intercept the light supplied from the light source to the light-conducting optical system by actuating a shutter means interposed between the light source and the light-conducting optical system.

In order to facilitate the observation of the object, a light-restricting blade is also interposed between the light source and the light conducting optical system. The light-restricting blade is normally located in the light path from the light source, but when the mirror 9 is moved upwardly for the exposure of the film, the switch $S_7$ is closed to operate the automatic exposure control mechanism and the light-restricting blade is moved out of the light path so as to illuminate the object by the light of full intensity and, after the proper exposure time determined by the automatic exposure control mechanism, the shutter means is automatically moved into the light path from the light source so as to terminate the exposure of the film. When the mirror 9 is moved to its object observing position after the exposure of the film so as to open the switch $S_7$, the light-restricting blade is moved into the light path from the light source while the shutter means is moved out of the light path for the next operation.

I claim:

1. An electrically operated camera for use with an endoscope having a light source for illuminating an object, the camera comprising a film feed shaft releasably connectable to a takeup spool for a film loaded in the camera for exposure to the light reflected from an object illuminated by the light source, the film having a forward end, a rear end and a plurality of frames therebetween, an automatic exposure control mechanism for intercepting the light reflected from the object automatically for setting the proper exposure thereof, a reversible electric motor in driving connection with the film feed shaft and rotatable in a film feeding direction and a direction opposite thereto, an electric motor operating circuit connected to the motor for rotating the motor in a respective one of said directions, a finder system, a movable mirror mounted in front of the film loaded in the camera, the mirror being arranged to assume a first position wherein the mirror directs the light from the object to the finer system for observation of the object and a second position wherein the mirror is displaced to allow the light from the object to reach the film for the exposure thereof, manually operable means for moving the mirror between the first and the second position and for controlling the motor operating circuit, a film feed stopping lever operably connected to the film feed shaft and controlling the motor operating circuit to stop the film feeding rotation of the motor each time the film feed shaft rotates a rotational angle sufficient to complete the feeding of the film by one of the frames thereof, the improvement comprising means actuated in the second position of the mirror for controlling the motor operating circuit to rotate the motor in said opposite direction, a regulating mechanism actuatably by the motor during the rotation thereof in the opposite direction, and a hook lever operably connected to the regulating mechanism and arranged to assume one position for holding the mirror in the second position thereof and another position for releasing the mirror to permit the mirror to return to the first position thereof after the motor has rotated a predetermined rotational angle in the opposite direction.

2. The electrically operated camera of claim 1, further comprising control means for controlling the rotational speed of the motor.

3. The electrically operated camera of claim 1, further comprising a hook latch lever operably connected to the film feed stopping lever and actuated by the regulating mechanism to release the film feed stopping lever, said stopping lever assuming a position permitting the motor to rotate again in the film-feeding direction after said release.

4. The electrically operated camera of claim 1, further comprising a switching mechanism for alternately connecting the motor to the regulating mechanism during the rotation of the motor in the opposite direction and to the film feed shaft during the rotation of the motor in the film feeding direction, the switching mechanism comprising a swingable lever pivotal about an axis, a first gear driven by the motor and mounted on the swingable lever for rotation about the axis, a pair of pinions rotatably mounted on the swingable lever and engaging the first gear, the mounting of the pinions including friction means causing some resistance to the rotation thereof, a second gear connected to the film feed shaft for rotation therewith, and a third gear coaxial with, and axially spaced from, the second gear, the third gear being freely rotatable relative to the second gear and connected to the regulating mechanism for rotation thereby, the pinions being correspondingly axially spaced from each other and being coplanar with the second and third gears, respectively, for alternate engagement of the respective pinions with the second and third gears upon pivoting of the swingable lever in opposite directions about said axis, the rotational friction of the pinions driven by the first gear pivoting the swingable lever in the direction or rotation of the first gear and the relative position of the respective pinions along the circumference of the second and third gears being such that the pinion coplanar with the second gear engages the second gear when the motor is rotated in the film-feeding direction while the pinion coplanar with the third gear engages the third gear when the motor is rotated in the opposite direction.

5. The electrically operated camera of claim 1, wherein the electric motor operating circuit comprises an electric power source having two terminals, two terminals on said motor, a first switch having a movable contact connected to one terminal of the motor and two stationary contacts, a junction connecting one of the stationary contacts to one terminal of the electric power source, a variable resistor connected in said junction, a second switch having a movable contact connected to the other stationary contact of the first switch and two stationary contacts, one of the stationary contacts of the second switch being connected to the other terminal of the electric power source, a third switch connected between the one stationary contact of the second switch and the other electric power source terminal, the third switch being closed only when the manually operable means is in an inactive position thereof, the other stationary contact of the second switch being connected to the junction between the one stationary contact of the first switch and the variable resistor, a fourth switch having a movable contact connected to the other terminal of the motor and two stationary contacts, a junction between one of the stationary contacts of the fourth switch and the other terminal of the electric power source, and a fifth switch having a movable contact connected to the other stationary contact of the fourth switch and two stationary contacts, one of the stationary contacts of the fifth switch being connected to the one electric power source terminal and the other stationary contact of the fifth switch being connected to the junction between the one stationary contact of the fourth switch and the other electric power source terminal, the third switch being opened when the manually operable means is moved into an actuating position wherein it moves the mirror into the second position thereof while the movement of the mirror into the second position operates the second switch to switch the movable contact thereof into connection with the other stationary contact of the second switch, the movable contact of the first switch being held in connection with the other stationary contact of the second switch, the movable contact of the fourth switch being held in connection with the other stationary contact of the fourth switch, and the movable contact of the fifth switch being held in connection with the other stationary contact of the fifth switch thereby permitting the motor to be rotated in the opposite direction wherein it actuates the regulating mechanism, the first, fourth and fifth switches being actuated by the regulating mechanism while the motor continues rotating in the opposite direction until the mirror is returned to the first position thereof by the disengagement thereof from the hook lever operated by the regulating mechanism, and the first and fourth switches being returned to their initial positions at the end of the operation of the regulating mechanism by the motor.

6. The electrically operated camera of claim 1, further comprising a mechanism for moving the film feed stopping lever out of operative connection to the film feed shaft to permit continuous feeding of the forward and rear ends of the film which are not to be exposed.

7 The electrically operated camera of claim 6, wherein said mechanism for moving the film feed stopping lever out of operative connection to the film feed shaft comprises a first cam operably coupled with the film feed shaft so as to be rotated a predetermined angle each time the film feed shaft feeds the film by one frame thereof, and a first lever engaging with said first cam and operably connected to the film feed stopping lever, the configuration of said first cam being so determined that said first lever is moved by said first cam to move said film feed stopping lever out of the operative connection to the film feed shaft for continuously feeding the forward end of the film which is not to be exposed.

8. The electrically operated camera of claim 7, further comprising a second cam rotatable together with said first cam, and a second lever engaging with said cam and connected to said first lever, the configuration of said second cam being so determined that said film feed stopping lever is moved out of the operative connection to the film feed shaft by said first lever connected to said second lever which is in turn actuated by said second cam for continuously feeding the rear end of the film which is not to be exposed.

* * * * *